Dec. 8, 1959  J. J. W. DEN HAAN ET AL  2,916,119
BRAKING DEVICE ASSOCIATED WITH A CENTRIFUGAL CLUTCH
Filed Jan. 6, 1955

INVENTORS
JOSE JAN WILLEM DEN HAAN
FRANCISCUS LAMBERTUS VAN WEENEN
BY
AGENT

United States Patent Office 2,916,119
Patented Dec. 8, 1959

2,916,119

BRAKING DEVICE ASSOCIATED WITH A CENTRIFUGAL CLUTCH

José Jan Willem den Haan and Franciscus Lambertus Van Weenen, Emmasingel, Eindhoven, Netherlands, assignors, by mesne assignments, to North American Philips Company, Inc., New York, N.Y., a corporation of Delaware Application January 6, 1955, Serial No. 480,212

Claims priority, application Netherlands January 20, 1954

5 Claims. (Cl. 192—15)

In engineering, it repeatedly occurs that a driving member and a driven member must be coupled with one another by a clutch which permits the driven member to attain gradually its maximum speed of rotation, while it must be prevented at the same time that the driven member should perform a movement opposite the operational direction, when the driving member is stopped. This is for example the case with a cold-gas reciprocating refrigerator, driven by a prime mover, for example an electric motor. When the electric motor is stopped and the system has come to a standstill, the refrigerator tends to operate as a hot-gas engine and to rotate in opposite direction. It is desirable for the coupling between the motor and the refrigerator to use a centrifugal clutch, which has many advantages, but which has a limitation in that, when the driving member stands still, the clutch is completely disconnected. This may have a detrimental effect, since for example the speed of the refrigerator may increase excessively. Other disadvantages are, moreover, inherent in this operation.

The invention has for its object to obviate the aforesaid disadvantages and is characterized in that the centrifugal clutch between the driving member and the driven member is provided with means to prevent the driven member from moving in a direction opposite the operational direction, when the driving member stops and the clutch is thus disconnected. The clutch itself is provided with means preventing the backward rotation, so that neither the driving member nor the driven member need be provided with particular means. Use may thus be made of a conventional electric motor.

According to one aspect of the invention the centrifugal clutch is preferably provided not only with the parts which establish the connection between the driving member and the driven member upon rotation, but also with one or more parts which rotate freely, when the clutch is operative and which, when the clutch is disconnected, connect the driven member with a fixed point on a stationary housing. In this embodiment of the invention the coupling elements proper stand still during the backward rotation, but for example the disc against which the parts subjected to the centrifugal force exert a pressure during operation, is braked during the backward rotation.

According to a further aspect of the invention the parts which, upon rotation, establish the connection between the driving member and the driven member under the action of the centrifugal force, may be provided with a resilient element in a manner such that, upon backward rotation of the driven member, the friction is sufficient for the torque then produced by this member to be transferred to the driving member, the latter member being provided with means preventing its backward rotation. The construction of the assembly in the said embodiment is simple and, since a plurality of parts are caught by the driven member, a certain frictional effect is already obtained.

According to a further aspect of the invention provision is preferably made of two or more pawls which are secured rotatably to the parts subjected to the centrifugal force and which are adapted to co-operate with a pawl wheel fixed to a stationary housing. Although, of course, use may be made of other means to prevent the backward rotation, for example a brake strap, the said embodiment has the advantage that always a positive braking effect is obtained, which is independent of the positions of the co-operating surfaces and permits a simple construction.

According to a further aspect of the invention the pawls are provided with a radial, resilient element, so that when the clutch stands still, always at least one pawl engages the pawl wheel, while the ratio between the weight of the pawls and the spring pressure is chosen to be such that upon a rotation of the clutch, the pawls are completely free from the pawl wheel. Thus the so-called clatter is completely avoided, while it is ensured that at least one pawl engages the pawl wheel immediately.

The invention will be described more fully with reference to the accompanying drawing, which shows one embodiment of the invention and in which.

Figure 1:
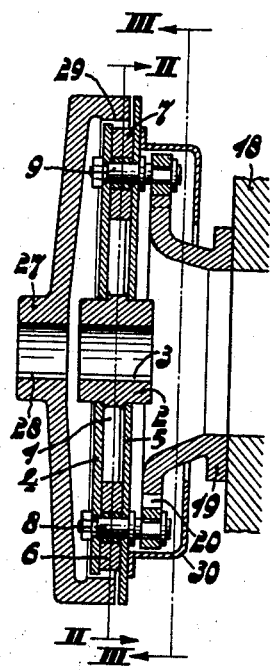
Fig. 1 is a sectional view of a centrifugal clutch taken along the lines 1—1 of Fig. 2.
Figure 2:
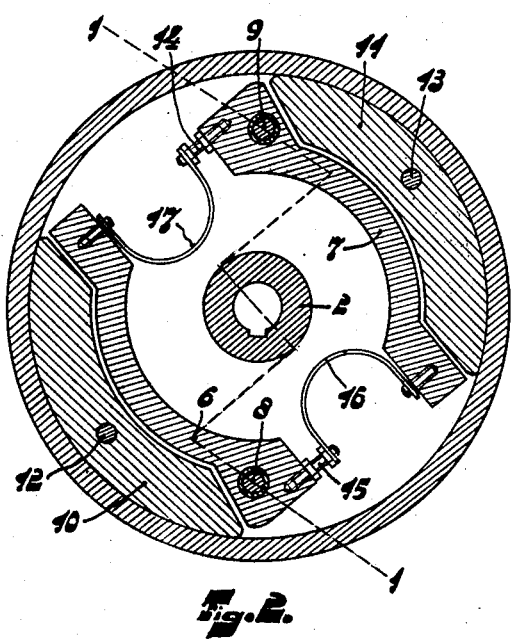
Fig. 2 is a sectional view of the clutch shown in Fig. 1, taken on the line II—II, viewed in the direction of the arrow.
Figure 3:
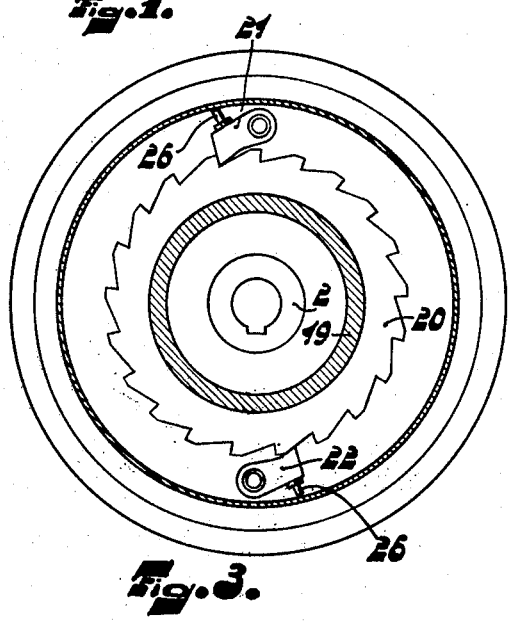
Fig. 3 is a sectional view of the clutch shown in Fig. 1, taken on the line III—III, also viewed in the direction of the arrow.
Figure 4:
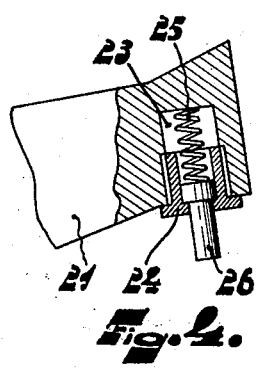
Fig. 4 shows, on an enlarged scale, a resilient element provided on the pawls.

Referring to the figures, reference numeral 1 designates a driving member, which is provided with a hub 2 with a key groove 3. The member comprises the hub 2 and two lateral plates 4 and 5. Between these lateral plates provision is made of two bodies 6 and 7, which are rotatable about connecting bolts 8 and 9. In the spaces adjacent to the outer surface of the bodies 6 and 7 provision is made of coupling shoes 10 and 11, which are rotatable about bolts 12 and 13, which are secured fixedly to the bodies 4 and 5. By means of adjustable screw bolts 14 and 15, which are screwed into the ends of the bodies 6 and 7, springs 16 and 17 are secured to the bodies 6 and 7. At the other end these springs are secured to the sides of the bodies 6 and 7 remote from the points of rotation 8 and 9.

A stationary housing 18 for the present braking device is shown in Fig. 1 and a body 19 is secured to a fixed point on the stationary housing which supports a pawl wheel 20. The pawl wheel 20, which preferably has an odd number of teeth, co-operates with two pawls 21 and 22, which are rotatable about the prolongations of the bolts 8 and 9. The pawls 21 and 22 have threaded openings 23 near their ends. Into this opening is screwed a screw cap 24, which holds a stud 26 subjected to the force of the spring 25. On the inner side a driven member 27, which is provided with a hub with a key groove 28, has a circular surface 29, with which the clutch shoes 10 and 11 co-act. Provision is finally made of a hood 30.

If the driving member 1 is seated for example on the shaft of an electric motor and if the driven member 27 is seated on the shaft of a cold-gas reciprocating refrigerator, the clutch shoes 10 and 11 will, when the electric motor is switched on, be urged under the action of the centrifugal force, against the surface 29, so that the refrigerator is started gradually. Also under the action of the centrifugal force the pawls 21 rotating with the member 1 will tend to move to the outside. This is prevented by the stud 26, which is subjected to the spring 25, but the weight of the pawls 21 and 22 is chosen to be such with respect to the force of the spring 25 that with a minimum speed of the clutch the pawls 21 and 22 are free from the pawl wheel 20. If the motor is stopped, the refrigerator will immediately tend to rotate in opposite direction and to operate as a motor. However, owing to the springs 16 and 17, the clutch shoes 10 and 11 do not completely disengage the surface 29 and the force with which these shoes are urged against the surface 29, when the clutch stands still, is so large that the friction thus produced against the surface 29 is sufficient for the torque produced by the refrigerator operating as a motor to be transmitted to the driving member 1. However, at the instant of the standstill, at least one of the pawls 21 or 22 approximately engages a tooth of the pawl wheel 20, under the action of the force exerted by the spring 25 on the stud 26, which bears on the inner side of the hood 30. Thus the driving member 1 can at the most rotate through a small angle in the wrong direction, so that also the refrigerator is braked in its operation as a motor, which is performed by the friction in a gradual and not in an abrupt manner.

When the electric motor is started, the pawls 21 and 22 will immediately disengage the pawl wheel 20 under the action of the centrifugal force against the pressure of the spring 25, so that clatter does not occur and wear is avoided.

Within the scope of the invention use may be made of other means for braking than the pawls and pawl-wheel structure described above. Use may for example be made of a brake strap, which is free from a stationary braking member in one direction and is stretched about the braking member by the bolts 8 and 9 in the other direction of rotation. The construction described above, however, has the advantage that it can be manufactured at low cost and is always reliable in operation.

What is claimed is:

1. A clutch-brake device for preventing retrograde movement comprising a driving member, a driven member, said driving member being provided with spaced plates, a centrifugal clutch, means mounting said centrifugal clutch on said driving member between said spaced plates, said centrifugal clutch including a pair of spring-urged shoes adapted to engage said driven member thereby transferring motive power from said driving member to said driven member to form a clutch coupling, said shoes being loosely mounted on said spaced plates for limited rotation therebetween, and means associated with said clutch for preventing the driven member from moving in a direction opposite to the normal operational direction when the driving member is stopped and said clutch coupling between the driving member and the driven member is interrupted.

2. A clutch-brake device for preventing retrograde movement as set forth in claim 1 further comprising a stationary housing having a pawl wheel and wherein said last-mentioned means includes at least one pawl which when said clutch coupling is disengaged said driven member engages said pawl wheel.

3. A clutch-brake device for preventing retrograde movement as set forth in claim 1 further comprising a stationary housing and wherein said braking device includes a pin-like member mounted on said driving member, spring means urging said pin-like member in an outward direction, said pin-like member at a given instant connecting said driven member with said stationary housing to prevent the backward rotation of said driven member.

4. A clutch-brake device for preventing retrograde movement as set forth in claim 2 further comprising at least two pawls on said driving member; a pawl wheel fixed on said stationary housing whereby said pawls co-act with said pawl wheel when the rotation of said centrifugal clutch is slowed to a predetermined speed.

5. A clutch-brake device for preventing retrograde movement as set forth in claim 4 wherein each of the pawls is provided with a radially projecting resilient element which when the clutch is disengaged said pawls engage said pawl wheel, and the ratio between the weight of each pawl and the pressure of the resilient element is such that when said clutch rotates the pawls are completely disengaged from said pawl wheel.

References Cited in the file of this patent

UNITED STATES PATENTS

| | | |
|---|---|---|
| 1,732,198 | Wagner | Oct. 15, 1929 |
| 1,821,838 | Juergens | Sept. 1, 1931 |
| 2,521,943 | Pitt | Sept. 12, 1950 |
| 2,525,402 | Dehn | Oct. 10, 1950 |
| 2,525,434 | Wehr | Oct. 10, 1950 |
| 2,559,765 | Gravina et al. | July 10, 1951 |